US012694862B2

(12) United States Patent
Kollenz et al.

(10) Patent No.: US 12,694,862 B2

(45) Date of Patent: Jul. 28, 2026

(54) ACTIVE NOISE CONTROL CLASSIFICATION SYSTEM

(71) Applicant: AUSTRIAN AUDIO GMBH, Vienna (AT)

(72) Inventors: Ludwig Kollenz, Wolkersdorf (AT); Michael Perkmann, Vienna (AT); Daniel Wöhrer, Gablitz (AT)

(73) Assignee: AUSTRIAN AUDIO GMBH, Vienna (AT)

( * ) Notice: Subject to any disclaimer, the term of this patent is extended or adjusted under 35 U.S.C. 154(b) by 0 days.

(21) Appl. No.: 19/142,218

(22) PCT Filed: Sep. 29, 2023

(86) PCT No.: PCT/EP2023/077053

§ 371 (c)(1),
(2) Date: Jun. 22, 2025

(87) PCT Pub. No.: WO2024/038216

PCT Pub. Date: Feb. 22, 2024

(65) Prior Publication Data

US 2026/0134860 A1 May 14, 2026

(30) Foreign Application Priority Data

Sep. 30, 2022 (EP) .................................... 22198999

(51) Int. Cl.

*G10K 11/178* (2006.01)
*H04R 1/10* (2026.01)

(52) U.S. Cl.

CPC .. *G10K 11/17853* (2018.01); *G10K 11/17815* (2018.01); *G10K 11/17817* (2018.01); *G10K 11/17881* (2018.01); *H04R 1/1083* (2013.01); *H04R 2460/01* (2013.01)

(58) Field of Classification Search

CPC ....... G10K 11/17853; G10K 11/17815; G10K 11/17881; G10K 11/17817; H04R 1/1083; H04R 2460/01

USPC .......................................................... 381/71.8

See application file for complete search history.

(56) References Cited

U.S. PATENT DOCUMENTS

| | | | | |
|---|---|---|---|---|
| 9,516,407 | B2 | 12/2016 | Goldstein | |
| 11,303,258 | B1 | 4/2022 | Bajic | |
| 2014/0044275 | A1 | 2/2014 | Goldstein | |
| 2022/0076656 | A1* | 3/2022 | He | G10K 11/17817 |
| 2022/0189451 | A1 | 6/2022 | Rui | |

FOREIGN PATENT DOCUMENTS

| | | | |
|---|---|---|---|
| WO | 2023280752 | A1 | 1/2023 |

* cited by examiner

*Primary Examiner* — Paul Kim

(74) *Attorney, Agent, or Firm* — Raven Patents, LLC; Anton E. Skaugset

(57) ABSTRACT

Methods of classifying and using acoustic filters for active noise control in hearing systems, such as headphones. The acoustic filters are determined and stored in a memory in the hearing system, making it therefore possible to quickly and efficiently select and use a certain filter in order to improve filter performance and filter stability in the hearing system.

8 Claims, 4 Drawing Sheets

ACTIVE NOISE CONTROL CLASSIFICATION SYSTEM

TECHNICAL FIELD

The present disclosure relates generally to audio technology, more specifically to Active Noise Control (ANC) systems, and more particularly to methods of optimizing the active noise control characteristics of a headphone by classifying and applying filters to enable Active Noise Control systems to recognize and adapt to a particular user.

BACKGROUND

Hearing systems of all kinds that employ Active Noise Canceling (hereafter referred to as ANC) are affected by the problem of ANC performance depending on the wearing situation. Individual ears are very different and the wearing situation changes every time the headphones are put on or inserted, which has a major impact on ANC performance, especially with static, i.e. non-adaptive systems. In addition, headphones do not usually have the same passive attenuation everywhere and in every wearing situation, which is why the passive attenuation of the headphones varies depending on the direction of incidence, and therefore also the ANC performance. In order to compensate for these influences and always ensure optimum ANC performance, a system must evaluate the current wearing situation/noise incidence direction and adapt the filters of the ANC circuit. Adaptive filters are a typical approach, with Least Mean Squares (LMS) being the most widely used. In practice, however, problems arise with this approach: Adaptive control usually assumes an identical sampling rate for the filter and the LMS algorithm. However, this is not usually the case in integrated circuits (ICs), as audio processing takes place at high sampling rates (e.g. 384 kHz) and control at low sampling rates (e.g. 16 kHz). For adaptive filters, there are only complex solutions to the problem, such as interpolation for higher sampling rates or frequency warping (if the hardware allows this at all). Another problem is the measurement. Since an adaptive filter attempts to minimize an error signal, in this case this refers to the signal at the feedback microphone of a hybrid ANC system (i.e. a system with a feedback and a feedforward path). However, this is not located at the wearer's eardrum, so the perception of the ANC effect by the wearer will deviate from the optimum of the filter, for example due to differences in the ear canal. Several attempts have therefore been made in the state of the art to improve ANC quality.

U.S. Pat. No. 9,773,490 B2 discloses a method in which an acoustic leakage between a loudspeaker of a headphone and an error microphone is measured or estimated and the feedback system is adjusted accordingly to avoid instabilities of the ANC system. The basis for this method is the presence of a source signal which is measured at the reference microphone. The problem is that in a typical application of ANC systems, no source signal is available.

U.S. Pat. No. 9,142,205 B2 also discloses a method that measures or estimates the acoustic leakage between the loudspeaker and the error microphone and adjusts the feedback ANC system so that part of the playback signal arriving at the reference microphone is not canceled out. The disadvantage of this method is that it only optimizes for ideal source signal playback performance.

U.S. Pat. No. 9,516,407 B2 shows a method for estimating the transfer function of an ANC system. One of the disadvantages of this method is the complex two-stage procedure of filter selection.

What is needed is an ANC system that can recognize and adapt to a user, their individual physical characteristics, and their wearing situation, and which selects filters adapted to the wearing situation in order to optimize the ANC characteristics of a headphone.

SUMMARY

The present disclosure is directed to methods of classifying and using acoustic filters for active noise control in hearing systems, including headphones. The acoustic filters are determined and stored in a memory in the hearing system before use, making it therefore possible to quickly and efficiently select and use a desired filter in order to improve filter performance and filter stability in the hearing system.

In one example, the present disclosure is directed to a method for classifying and applying filters for active noise control in a hearing system, where the hearing system has at least one feedforward microphone and at least one feedback microphone, at least one loudspeaker, at least one integrated circuit including a memory and at least one processor unit, at least one feedback audio path described by a feedback transfer function and at least one feedforward path described by a feedforward transfer function. The method includes the steps of:

a) receiving a first audio signal that is a feedback microphone signal at the at least one feedback microphone, and receiving a second audio signal that is a feedforward microphone signal at the at least one feedforward microphone;

b) estimating the feedback transfer function by an adaptive algorithm based on a comparison of the feedback microphone signal and a loudspeaker signal;

c) calculating at least one of multiple relevant properties from the estimated feedback transfer function;

d) determining a level at the at least one feedback microphone in relation to a level at the at least one feedforward microphone;

e) selecting, by a classifying algorithm, a set of filter coefficients based on the calculated relevant properties of the estimated feedback transfer function and the determined level of the at least one feedback microphone, either by outputting a discrete class assigned to a set of filters stored on the memory of the hearing system or by outputting a one-dimensional function that selects a set of filters stored on the memory of the hearing system;

f) applying the selected filter coefficient set as a feedback filter in the current feedback audio path;

g) estimating the feedforward transfer function by comparing the received feedforward signal and the received feedback microphone signal using an adaptive algorithm to estimate the feedforward transfer function;

h) calculating at least one of multiple relevant properties from the estimated feedforward transfer function;

i) determining a performance indicator by referencing the received feedback microphone signal to the feedforward microphone signal;

j) selecting a second set of filter coefficients using the calculated relevant properties of the estimated feedforward transfer functions of step h) and the determined performance indicator of step i) as inputs of a classifying algorithm which uses them to select the second set of filter coefficients, either by outputting a discrete class associated with a set of filters stored on the memory of the hearing system, or by outputting a one-dimensional function which selects a set of filters stored on the memory of the hearing system;

k) applying the second set of filter coefficients as a feedforward filter in the current feedforward audio path; and l) readjusting the feedback filter and the feedforward filter by performing steps a)-k) again, or readjusting only a feedforward filter by performing steps g)-k) again.

The features, functions, and advantages of the disclosed methods may be achieved independently in various embodiments of the present disclosure, or may be combined in yet other embodiments, further details of which can be seen with reference to the following description and drawings.

DETAILED DESCRIPTION OF PREFERRED EMBODIMENTS

Figure 1:
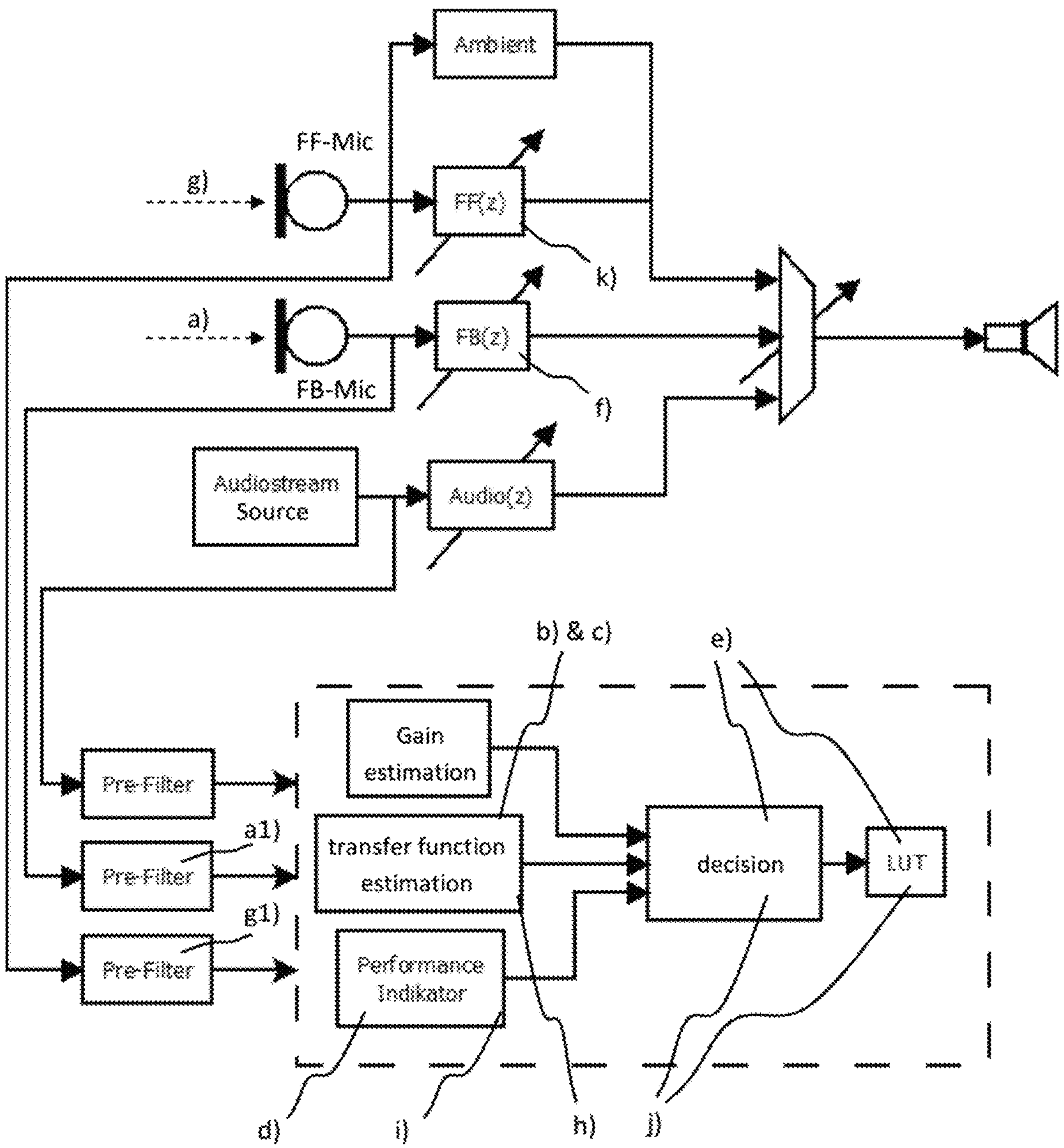
FIG. 1 is a schematic representation of an exemplary method of the present disclosure.

As used in the present disclosure, reference to hearing aids or headphones (including over-ear, on-ear, in-ear or ear bud types) should be considered to be synonymous, and to include all types of hearing systems that include ANC (used herein as an acronym for either Active Noise Canceling or Active Noise Control, and used synonymously with ANR, or Active Noise Reduction).

The present disclosure is directed to a method for classifying and applying ANC systems in a hearing system. In other words, a method is used which identifies the wearing situation and noise incidence direction of ANC headphones as well as the physical characteristics (e.g. ear shape, jaw/skull shape, . . . ) of the person wearing the headphones and, by means of a classifying algorithm, selects the filter best suited to the respective wearing situation and noise environment from a large number of filters so that this can be applied to the ANC system. A major advantage of the method is that the ANC system can operate independently of the sampling rate of the system selecting the filter. The independent implementation between the filter selecting system part and the ANC system part enables a more energy efficient and error resistant implementation.

Before the present method can be used, measurements must be carried out for headphones using the method according to the present disclosure and the transmission paths for different ears (which are shaped differently for each wearer), wearing situations and directions of noise interference in different environments must be determined. These measurements are carried out in a controlled environment (e.g. acoustic laboratory) on one or more headphones of the same model. Based on these measurements, a set of filters is determined which covers the different situations (or averages of these). This set of filters represents the widest possible range of situations in which noise can occur, from street noise to turbine noise, the background noise of a coffee house to children playing. Due to the controlled environment of the acoustic laboratory, there are hardly any limits for the technicians.

For a selected sampling rate, these filters are stored (saved) in a memory located in the headphones. Depending on the topology of the IC used in the headphones, these (stored) filters can be FIR (finite impulse response) or IIR (infinite impulse response) coefficients. During operation of the headphones, a novel classifying algorithm then decides which set of filter coefficients currently delivers the best ANC performance and applies these filters in the audio signal chain. For a typical application, the adaptation process comprises the following steps according to the present disclosure:

1) Classification of which set of coefficients delivers the best performance.
2) Applying the selected set of coefficients in audio processing.
3) Adjust the gain of the current filter.
4) Stopping the adaptation as long as the performance remains good, starting the adaptation as soon as the performance exceeds a threshold value and stopping the adaptation in the event of disruptive events that hinder the controlling (e.g. chewing movements, etc.).

FIG. 1 shows a schematic representation of a method according to the present disclosure, in which a classifying algorithm decides as to which filter, defined by a set of coefficients, currently provides the best ANC performance and applies these filters in the audio signal chain. The method comprises an audio system with at least one feedforward microphone and at least one feedback microphone, at least one loudspeaker, at least one integrated circuit consisting of a memory and at least one processor unit, at least one feedback path and at least one feedforward path and runs through several steps:

a) Receiving an audio signal, referred to as a feedback microphone signal, by the at least one feedback microphone (FB microphone) and an audio signal, referred to as a feedforward microphone signal, by the at least one feedforward microphone (FF microphone).

a1) Optional: Pre-filtering of the audio signal, whereby classic high-pass, low-pass, band-pass or similar filters can be used. filters can be used (see also FIG. 2). The objective of the pre-filter is, for example, to limit and/or weight the frequency-related bandwidth range for ANC optimization.

b) Estimation of the transfer function of the feedback path (FB path) based on the comparison of the internal (feedback) microphone signal and the speaker signal, whereby an adaptive algorithm (adaptive algorithms include, for example, all LMS variants including the new PEAK-LMS, RLS, affine projection or algorithms based on cross-correlation) is used to estimate the transfer function, whereby variants in the time domain as well as in the frequency domain (subband/frequency-domain LMS) are possible.

c) Calculation of various, not necessarily all but at least one, relevant properties from the transfer function of the feedback path. This can be one, several or all of the following properties: Total gain, temporal centroid, mean energy, envelope, rise time of the envelope, crest factor, autocorrelation, histogram, spectral flatness measure or kurtosis. The calculation is carried out using algorithms known to the skilled person from the state of the art.

d) Determination of the performance indicator based on the level at the feedback microphone in relation to the feedforward microphone.

e) Selection of a set of coefficients by a classifying algorithm, based on the relevant properties of the transfer function determined in c) and the level determined in d), whereby there are two possibilities: Either the classifying algorithm (hereafter called "classifier") discretely outputs a class to which a set of filters stored on a memory located in the headphone is assigned, or the classifier outputs a one-dimensional function. Suitable classifying algorithms are, for example: Decision Tree, Support Vector Machine, Multivariate Gaussian or Neural-Network. Preferred implementations are Decision Tree and non-linear multilayer neural networks. The training of the classifying algorithm is usually done offline, i.e. under laboratory conditions. In the case of a discrete output, the decision for a filter is made by the classifying algorithm, which has been trained to select a filter, by selecting a specific filter from the list of stored filters. In the case of a one-dimensional function, there is a quantifier that assigns a filter function to each value range. In both cases, each class is assigned a set of filter coefficients that can be taken from the lookup table (LUT). The one-dimensional function is particularly advantageous when using a neural network. A neural network as a classifier has one neuron for each class in the output layer. This means a certain computational effort, which can be reduced if the network is reduced to a single output neuron. In this case, the output neuron runs through the classes (here the LUT). In this sense, the output of the network is understood as a one-dimensional function, which is quantized and assigned to the LUT f) Application of the coefficient set of the filter selected in e) in the current feedback audio path, i.e. the coefficients are copied to the current feedback audio path FB (z) (symbolized by the slanted arrows for a variable function block) or a reference is made to the start address of the coefficients g) With FB-ANC activated, the feedforward path (FF path) is estimated on the basis of the comparison of the external (feedforward) and internal (feedback) microphone signal determined under a), whereby an adaptive algorithm (LMS or similar, see also point b) is used to estimate the transfer function of the FF path, whereby both variants in the time domain and in the frequency domain (subband/frequency-domain LMS) are possible.

h) Calculation of various, not necessarily all but at least one, relevant properties from the transfer function of the feedforward path, analogous to point c). This can be one, several or all of the following properties: Total gain, temporal centroid, mean energy, envelope, rise time of the envelope, crest factor, autocorrelation, histogram, spectral flatness measure or kurtosis. The calculation is carried out using algorithms known to the skilled person from the state of the art.

i) Determination of a performance indicator by referencing the feedback microphone signal (FB mic signal) to the feedforward microphone signal (FF mic signal), analogous to point d). This shows the current ANC performance of the system. Referencing is, for example, a division and is preferably performed in the frequency domain, but can also take place in the time domain if necessary. In the case of division in the time domain, the signals are averaged and rectified before division, followed by additional smoothing with optional filtering to focus on frequency ranges. In the case of division in the frequency domain, smoothing is also useful and possible. In the case of smoothing, its output is used as a performance indicator. In this sense, smoothing is a form of averaging the results of the division over a defined period of time. The corresponding time period can be freely defined within limits that make sense for the application.

j) The transfer functions estimated in h) and the performance indicator determined in i) are used as inputs to a classifying algorithm, shown in FIG. 1 as the "Decision" block, which uses them to select a set of coefficients, either by outputting a discrete class associated with a set of filters stored in the headphone memory, or by outputting a one-dimensional function that selects a set of filters stored in the headphone memory, whereby most classifying algorithms are suitable for the task. Examples are again: Decision Tree, Support Vector Machine, Multivariate Gaussian, Neural-Network. Preferred implementations are Decision Tree and non-linear multilayer neural networks. The training of the classifying algorithm is usually carried out offline, i.e. under laboratory conditions, analogous to point e). All statements made in point e) regarding discrete filter classes and one-dimensional functions are also applicable to this case.

k) Application of the filter function selected in j), i.e. the coefficients are copied to the current feedforward audio path FF (z) (symbolized by the slanted arrows for a variable function block) or a reference is made to the start address of the coefficients.

l) Readjustment of the filters by running through the method according to the invention again, whereby either the entire method from point a) is run through again, or only the FF filter is adjusted (running through the method from point g). If only the FF filter is adjusted, the FF microphone signal is received and processed again between f) and g). If the FB filter is adjusted, the FF filter is always adjusted as well; conversely, the FF filter can be adjusted without adjusting the FB filter. The FB filter is therefore adjusted the same number of times as the FF filter. The decision as to whether only the FF filter is adjusted or whether both the FF and FB filters need to be adjusted can either be specified by a fixed scheme defined in advance, determined by user input or decided by an algorithm (e.g. based on the performance indicator, the sound pressure or a similarly suitable measure of system quality).

The use of the pre-filters from point a1) is optional. For a system with several FF or FB microphones or loudspeakers, the FF or FB paths must be determined for each of the desired combinations. This step is—for the person skilled in the art—with knowledge of the invention logical and can be carried out without further explanation. Nevertheless, the singular of the components was chosen in the description of the method above to make the example easier to read.

If a gain control (amplification) is part of the system, the gain of the filter can optionally be adjusted either before, in parallel or after the filter selection. It should be noted that the estimated and the applied transfer function may be different. Once the classifier has decided on a class (determined, for example, by the wearing situation), the filter coefficients assigned to the class are applied in the ANC path. The filter, based on the selected coefficients, can be the correct choice in different wearing situations as long as the gain is adjusted correctly. This can lead to a situation where, from a purely mathematical point of view, a different filter would be more suitable, but the selected filter has a sufficiently strong effect due to the gain to not yet trigger an adjustment of the filter. In this case, there is therefore an interplay between the gain estimator and the classifier. A gain estimator can be a PID controller, LMS (with a coefficient) or cross-correlation.

In addition to the FF and FB filters already mentioned (shown as FF (z) and FB (z) in FIG. 1), the coefficient set can also contain different coefficients for audio playback. As with the ANC paths, the audio playback path depends not only on the audio source (audio stream source in FIG. 1), but also on the wearing situation and the physical characteristics (e.g. ear shape, jaw/skull shape, . . . ) of the person wearing the headphones and should ideally also be adjusted. This variable filter for audio playback (or useful signal playback such as music) is shown in FIG. 1 as Audio (z).

With the external microphone, it is also possible to feed the soundscape or the surrounding background noise into the audio signal chain, modified by a filter if necessary. Such a reproduction of the external sound is referred to as Ambient Mode, Transparency Mode, Talk Through, Hear Through, etc. and is shown as "Ambient" in FIG. 1.

All these described audio signal chains (ANC paths, audio playback path and ambient path) are combined via a mixer before playback. Like the individual paths, this can also be equipped with a variable gain.

The final reproduction of the audio signal chain can take place via various systems such as dynamic loudspeakers, balanced armature drivers, MEMS speakers, bone-conduction systems, etc. and is shown in FIG. 1 as a loudspeaker.

The selection of the filter function and the calculation of the gain can take place simultaneously or alternately (ping-pong mode). Simultaneous here means that the processor performing the calculation makes the calculation results available to the system at the same time at the end of the calculating cycle. The duration of a calculation cycle with alternating selection of the filter function and calculation of the gain (ping-pong mode) can be selected variably. For example, the system can allow the estimate of the transfer function to converge for 100 ms, then adjust the gain for 100 ms, then estimate the transfer function again, and so on. Variations of this scheme are easily understandable and feasible for the person skilled in the art with knowledge of the invention.

Figure 2:
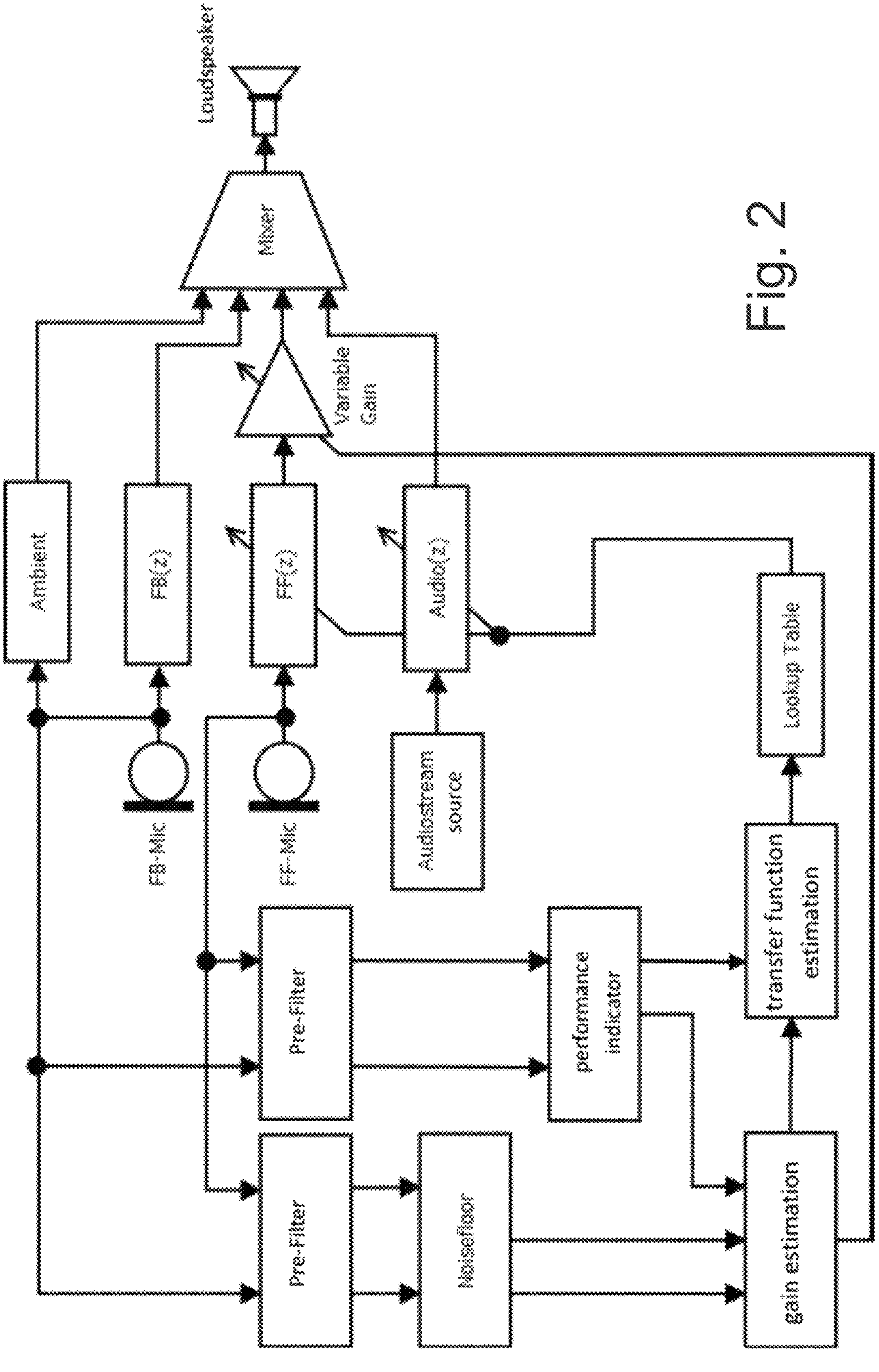
FIG. 2 is a schematic representation of an application example of the method according to FIG. 1.

FIG. 2 shows an application example of the method according to FIG. 1, in which the selection of the filter function and the calculation of the gain are performed simultaneously. As explained in the description of FIG. 1, the gain of the filter can optionally be adapted either before, in parallel or after the filter selection (see points e) or j) in the description of FIG. 1). This variant of simultaneous gain/filter adaptation uses the gain controller as the main control element, which initiates or forces the change between the filter functions. The process sequence of the example shown in FIG. 2 is therefore analogous to that in FIG. 1, with the following differences:

I. After an initial adjustment of the FB and FF filter, the gain of the filter can be adjusted (shown as Variable Gain).

II. The level at the feedback microphone (point a) in the description of FIG. 1) and at the feedforward microphone (point g) in the description of FIG. 1) and/or the performance indicator (point i) in the description of FIG. 1) are used to determine the ideal filter gain for the wearing situation ("Gain estimation" function block)

III. This information is taken into account in the block for estimating the transfer function of the FF filter (FF (z); point j) in the description of FIG. 1) and is used to classify and apply the set of coefficients matching the ideal gain value in audio processing (point k) and following in the description of FIG. 1).

IV. The adaptation of the amplification (of the "variable gain" in FIG. 2) stops in the event of disturbance events that hinder control (chewing movements, etc.).

A gain estimator from step II. can be a PID controller known from control engineering, an LMS algorithm (with one coefficient) or a cross-correlation function. (see above)

With regard to step IV (stopping or starting the adaptation), there are several subsystems: Firstly, there is a noise floor for each of the different parts of the system, i.e. a lower threshold value that can be given as an absolute limit by the sensor sensitivity or can be defined for the algorithm. Adaptation is stopped if the value falls below this threshold. An example of this is a quiet environment: as there is hardly any energy in the acoustic signal, only poor estimates can be made, which are not relevant for a good ANC performance, as the environment is quiet anyway. It is therefore preferable to stop the system, as otherwise the ANC system itself may cause noise in the worst case. To ensure a defined state in these situations, it is advantageous to switch to a typical static filter. A default filter is therefore defined for the algorithm, which can be used in such situations to achieve this defined state known to the algorithm.

In environments with sufficient acoustic energy, i.e. with background noise that is sufficiently strong for the algorithm, i.e. above a threshold value, the adaptation of the filters is only paused if the performance (indicated by the performance indicator) is sufficiently good or interference events are detected. The threshold values for starting and stopping the adaptation based on the indicator can be static or adaptive as already described and change in the latter case with a long-term averaging of the overall ANC performance. In the adaptive case, the algorithm attempts to achieve a noise minimum. However, depending on the acoustic environment and the position of the listener, optimum performance cannot always be achieved. Stopping the adaptation is necessary to prevent borderline cases in which the classifier would constantly switch between two states (e.g. two filters). In the event of disruptive events, it is then advantageous to pause adaptation, in order to prevent incorrect adaptation. For this purpose, a reference threshold value is defined to which the smoothed signal is fed. The decision as to whether adaptation takes place is made by a threshold value switch, which usually has a hysteresis. The performance indicator thus also prevents too frequent jumping between filters.

Even if the adaptation of the estimation of the transfer function is stopped, the classifier can be set to observe the current value of the gain estimate: If the value of the gain estimate is at its maximum or minimum over a defined period of time, the classifier can switch to the next higher or lower filter class. The reason for this is that with a constantly high gain, for example, a neighboring filter probably delivers better results with a medium gain, which was not represented by the estimation of the transfer function.

In the simplest case, the classifier only pays attention to the gain estimate, since in extreme cases the transfer function can only be made dependent on the gain estimate, and switches classes according to this information.

Figure 3:
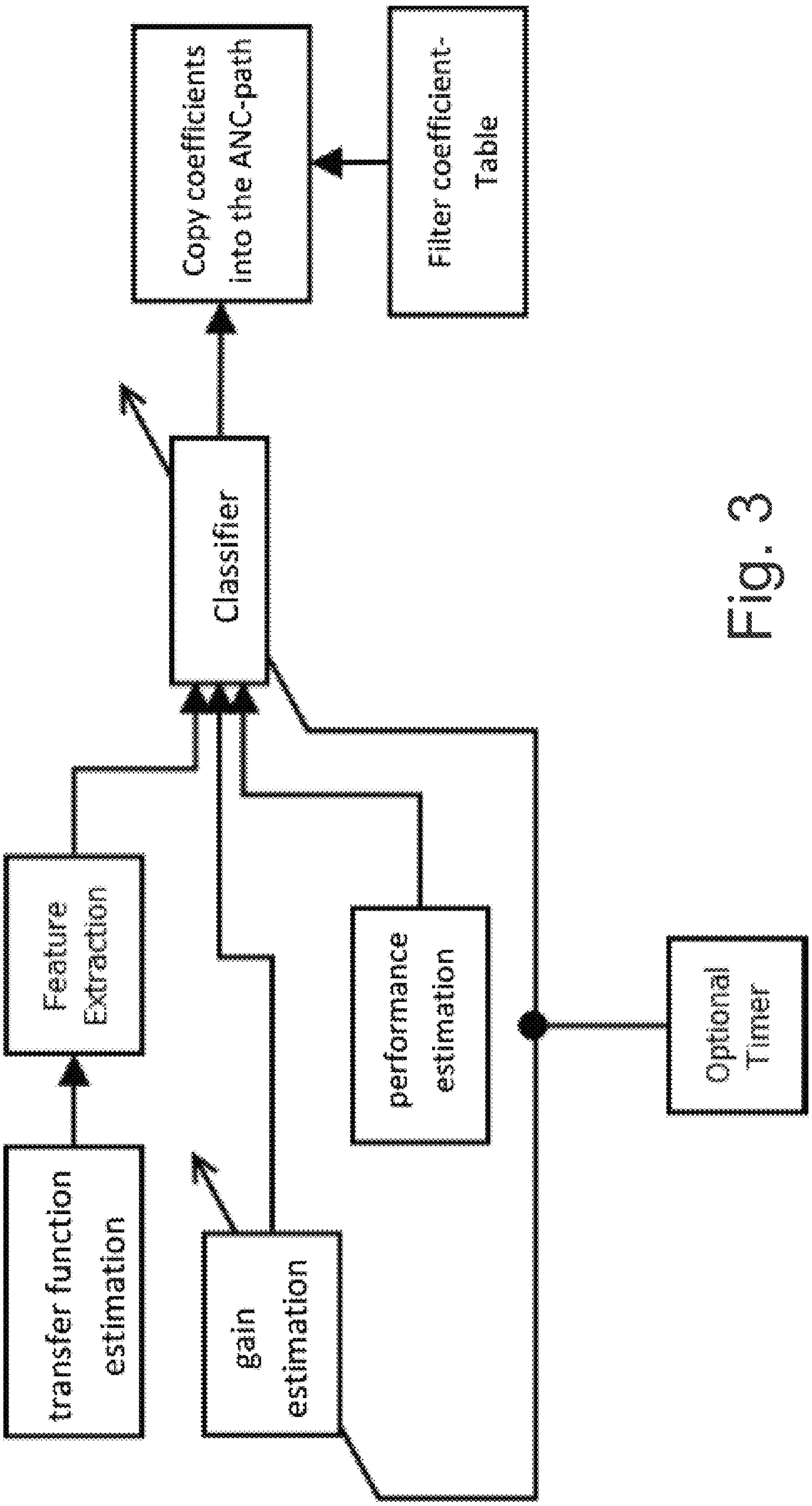
FIG. 3 is a flow chart of the classifier of the exemplary method of FIG. 1 or FIG. 2.

FIG. 3 shows the flowchart of the classifier used in the examples in FIG. 1 and FIG. 2 with an optional timer that is used for the ping-pong variants. The timer has a duty cycle, similar to a periodic rectangular function, and fulfills the task of switching between gain estimation and classifier. A comparable timer can also be used to control the sequence of adaptation passes for FB and FF filters (point l) in the description of FIG. 1).

Figure 4:
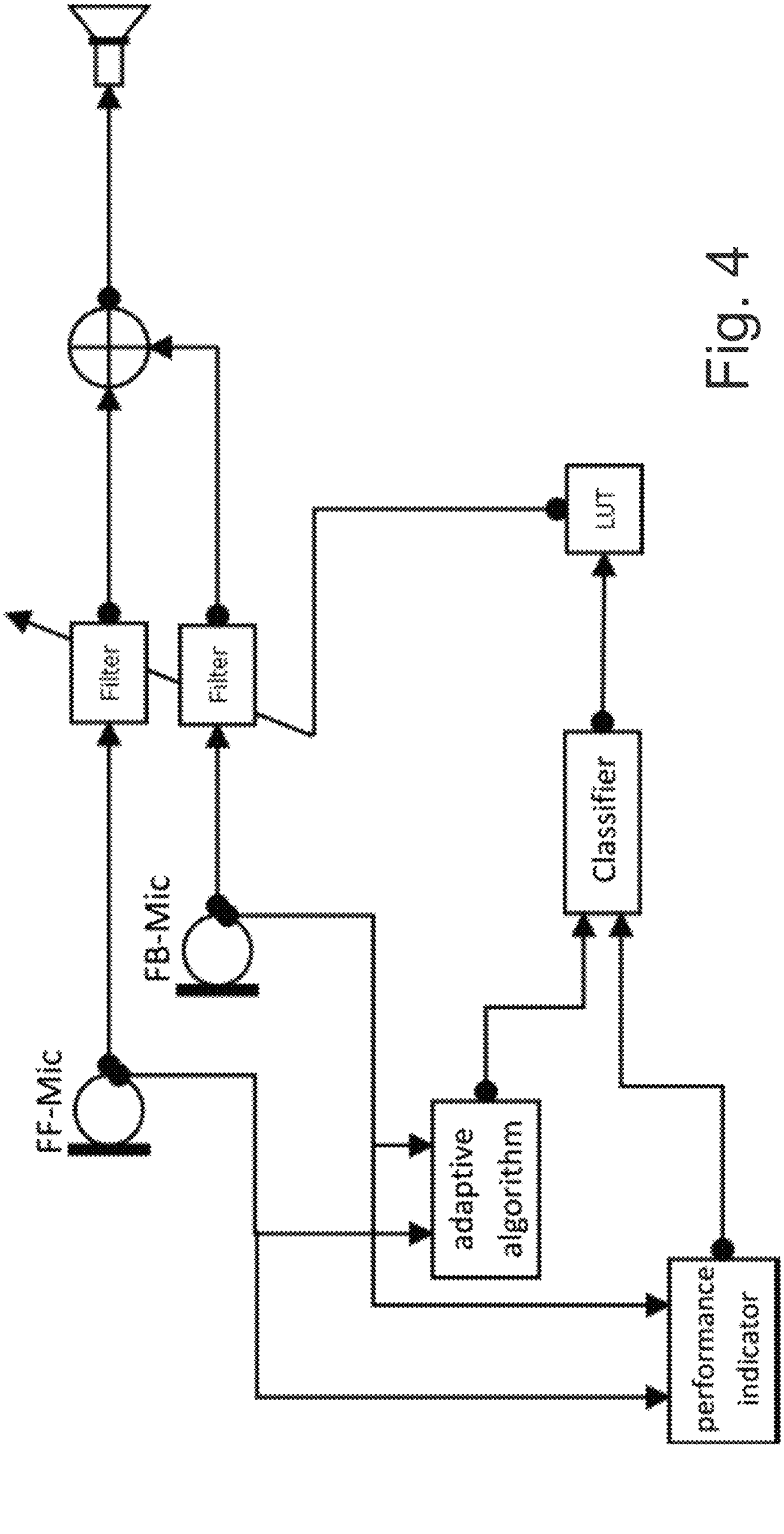
FIG. 4 is a flow chart illustrating filter selection by the classifier of FIG. 3.

FIG. 4 shows a flow chart illustrating the filter selection by the classifying algorithm (classifier), whereby the scheme only applies to the first run from sub-item g) of the process flow. In it, an adaptive algorithm (see point b) or h)) is used to estimate the transfer functions of the FF path and/or the FB path and a performance indicator is used, which is determined by referencing the feedback microphone signal to the feedforward microphone signal (see point i)). The transfer functions estimated by the adaptive algorithm and the performance indicator serve as input to the classifying algorithm. The estimated transfer function provides the classifying algorithm with the characteristics of the current wearing situation based on the energy content of the ambient sound, i.e. it "recognizes" the situation and attempts to select the correct filter based on the transfer function. The performance indicator, on the other hand, shows the classifying algorithm whether the selected filter is sufficiently suitable for the analyzed and classified situation or whether a better filter needs to be selected. The classifier processes both parameters together. This is done by the classifying algorithm, such as a neural network, mapping the mismatch between the measurement point (FB microphone) and the target point (eardrum) based on its pre-training. This information is used to recognize which suitable filter is assigned to which mismatch based on the transfer function estimated by the adaptive algorithm. The filter determined is taken from the lookup table (LUT) stored on the IC. The filter taken from the LUT is subsequently applied in the FF or FB path.

The advantage of using such a classifier over adaptive filters is the possibility of carrying out measurements in advance (e.g. in special laboratories by a specialist), which allows taking into account different conditions, such as an anechoic room or a diffuse sound field. In addition, the filters can be calculated for different sampling rates than the sampling rate of the classifier. For example, it is common for classifiers to work with sampling rates <50 kHz, while filters with >300 KHz are used. Another major advantage of the invention compared to an adaptive system, which calculates the filters in real time, is the possibility of determining the filters, for example, with in-situ measurements, i.e. with probe microphones close to the eardrum (usually the target point).

Another particularly advantageous feature of the classifier is that the LUT is separate from the transfer function estimation and any classification can be performed. It should be mentioned that in contrast to the prior art (U.S. Pat. No. 9,516,407 B2) the transfer function to the target point is already inherently present in the LUT due to the laboratory-based characterization measurements and is not estimated and applied, as in the application U.S. Pat. No. 9,516,407 B2. The transfer function estimation is limited to its reference points: for example, the microphones (feedforward and feedback). The filters in the LUT can be created for any target point, which does not necessarily have to correspond to the microphone points. The classifier is trained in such a way that it maps the difference between the microphone point and the target point.

Example: The filters in the LUT are designed for the target point (as close as possible to the eardrum). The transfer function estimation optimizes for the feedback microphone point. The classifier is trained under laboratory conditions using in-situ measurements for the target point in reference to the microphone points (feedforward and feedback).

The filters are arranged hierarchically by class in a filter matrix depending on shape and gain. This enables sequential jumps and allows the algorithm to vary between two filters with slightly different shapes or slightly different gains in borderline cases.

A major advantage of this method over adaptive filters is that only useful filters are stored in the memory. The ANC algorithm therefore does not run the risk of getting stuck on local optima. The system is therefore stable in any case and does not generate any artifacts (e.g. Hiss-Noise).

A particularly preferred embodiment of this method uses a combination of a classical LMS algorithm and a PEAK filter within the meaning of application PCT/EP2022/068392, published as WO2023280752A1 on Jan. 12, 2023, instead of just a classical LMS algorithm. In this way, the advantages of the cited application are transferred to the application presented here.

In addition, an audio playback filter can be assigned to each class (alongside feedforward and/or feedback filters). This is intended for playing an audio source (e.g. Bluetooth audio or 3.5 mm jack) and has the task of keeping the sound constant when the wearing situation changes.

The feedback path is defined as a transmission path, described as a transfer function, between an internal feedback microphone located near the loudspeaker and the loudspeaker.

The feedforward path is defined as the calculated transfer distance (transfer function) based on the transfer function of the FF microphone, the internal transfer function of the loudspeakers (headphone loudspeaker frequency response) and the transfer function of the passive attenuation (mechanical system).

Selected Embodiments

This section describes additional aspects and features of the disclosed method presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. Method for classifying and applying filters for active noise control in hearing systems with at least one feedforward microphone and at least one feedback microphone, at least one loudspeaker, at least one integrated circuit comprising a memory and at least one processor unit, at least one feedback path described by a transfer function and at least one feedforward path described by a transfer function, comprising the steps of a) receiving an audio signal, referred to as a feedback microphone signal, by the at least one feedback microphone and an audio signal, referred to as a feedforward microphone signal, by the at least one feedforward microphone, b) the estimation of the transfer function of the feedback path by an adaptive algorithm based on the comparison of the feedback microphone signal and a loudspeaker signal, c) the calculation of various, not necessarily all but at least one, of the relevant properties from the transfer function of the feedback path estimated in b), d) the determination of the level at the feedback microphone in relation to the feedforward microphone, characterized in that e) the selection of a set of coefficients by a classifying algorithm, based on the relevant properties of the transfer function determined in c) and the level determined in d), is performed either by outputting a discrete class assigned to a set of filters stored on the memory located in the headphone, or by outputting a one-dimensional function that selects a set of filters stored on the memory located in the headphone, f) the application of the filter coefficient set selected in e) in the current feedback audio path, g) the estimation of the transfer function of the feedforward path by comparing the feedforward and feedback microphone signals determined in a), using an adaptive algorithm to estimate the transfer function of the feedforward path, h) the calculation of various, not necessarily all but at least one, of the relevant properties from the transfer function of the feedforward path estimated in g), i) the determination of a performance indicator by referencing the feedback microphone signal determined in a) to the feedforward microphone signal, j) using the transfer functions estimated in h) and the performance indicator determined in i) as inputs of a classifying algorithm which uses them to select a set of coefficients, either by outputting a discrete class associated with a set of filters stored on the memory located in the headphone, or by outputting a one-dimensional function which selects a set of filters stored on the memory located in the headphone, k) the application of the set of filter coefficients selected in j) in the current feedforward audio path, l) and readjusting the filters by running the method according to the invention again, whereby either the entire method from point a) is run again, or only the feedforward filter is adjusted, i.e. the method is run from point g).

A2. Method for classifying and applying filters for Active Noise Control in hearing systems according to paragraph 1, characterized in that after the audio signal has been received by the feedback microphone, the audio signal is pre-filtered by a high-pass, low-pass, band-pass or similar filter. filter is carried out.

A3. Method for classifying and applying filters for Active Noise Control in hearing systems according to paragraph A1 or A2, characterized in that after reception of the audio signal by the feedforward microphone, pre-filtering of the audio signal is carried out by a high-pass, low-pass, band-pass or similar filter. filter is carried out.

A4. Method for the classification and application of filters for Active Noise Control in hearing systems according to one of paragraphs 1 to 3, characterized in that after an initial adjustment of the feedback and feedforward filter, the gain of the filter can be adjusted.

A5. Method for classifying and applying filters for Active Noise Control in hearing systems according to one of paragraphs A1 to A4, characterized in that the level at the feedback microphone and/or the performance indicator is used to determine the ideal filter gain for the wearing situation.

A6. Method for classifying and applying filters for Active Noise Control in hearing systems according to one of paragraphs A1 to A5, characterized in that a default filter is defined for the system, which is used when the sensor sensitivity of the ANC system falls below a predefined threshold value.

A7. Method for classifying and applying filters for Active Noise Control in hearing systems according to one of paragraphs A1 to A6, characterized in that the filters are arranged hierarchically sorted by class in a filter matrix as a function of shape and gain.

In summary, the present disclosure relates to a method for classifying and applying acoustic filters for Active Noise Control in hearing systems, whereby the filters are determined in advance and stored in a memory in the headphones. While wearing the headphones, it is thus possible to quickly and efficiently select and apply a specific filter to improve ANC performance and stability.

The characteristics and variants specified for the individual embodiments and examples disclosed herein may be freely combined with those of the other examples and embodiments and may in particular be used to characterize the invention in the claims without necessarily entraining the other details of the respective embodiment or the respective example.

The invention claimed is:

1. A method for classifying and applying filters for active noise control in a hearing system having at least one feedforward microphone and at least one feedback microphone, at least one loudspeaker, at least one integrated circuit comprising a memory and at least one processor unit, at least one feedback audio path described by a feedback transfer function and at least one feedforward path described by a feedforward transfer function, comprising the steps of:

a) receiving a first audio signal that is a feedback microphone signal at the at least one feedback microphone, and receiving a second audio signal that is a feedforward microphone signal at the at least one feedforward microphone;

b) estimating the feedback transfer function by an adaptive algorithm based on a comparison of the feedback microphone signal and a loudspeaker signal;

c) calculating at least one of a plurality of relevant properties from the estimated feedback transfer function;

d) determining a level at the at least one feedback microphone in relation to a level at the at least one feedforward microphone;

e) selecting, by a classifying algorithm, a set of filter coefficients based on the calculated relevant properties of the estimated feedback transfer function and the determined level of the at least one feedback microphone, either by outputting a discrete class assigned to a set of filters stored on the memory of the hearing system or by outputting a one-dimensional function that selects a set of filters stored on the memory of the hearing system;

f) applying the selected set of filter coefficients as a feedback filter in a current feedback audio path;

g) estimating the feedforward transfer function by comparing the received feedforward signal and the received feedback microphone signal using an adaptive algorithm to estimate the feedforward transfer function;

h) calculating at least one of a plurality of the relevant properties from the estimated feedforward transfer function;

i) determining a performance indicator by referencing the received feedback microphone signal to the feedforward microphone signal;

j) selecting a second set of filter coefficients using the calculated relevant properties of the estimated feedforward transfer functions of step h) and the determined performance indicator of step i) as inputs of a classifying algorithm which uses them to select the second set of filter coefficients, either by outputting a discrete class associated with a set of filters stored on the memory located in the hearing system, or by outputting a one-dimensional function which selects a set of filters stored on the memory located in the hearing system;

k) applying the second set of filter coefficients as a feedforward filter in a current feedforward audio path; and l) Readjusting the feedback filter and the feedforward filter by performing steps a)-k) again, or readjusting only the feedforward filter by performing steps g)-k) again.

2. The method of claim 1, wherein after the feedback microphone signal has been received, the feedback microphone signal is pre-filtered.

3. The method of claim 1, wherein after reception of the feedforward microphone signal by the feedforward microphone, the feedforward microphone signal is pre-filtered.

4. The method of claim 1, wherein after an initial adjustment of the feedback filter and the feedforward filter, a gain of the feedback filter and/or the feedforward filter can be adjusted.

5. The method of claim 4, wherein the level at the at least one feedback microphone and/or the determined performance indicator is used to determine an ideal filter gain for a selected wearing situation.

6. The method of claim 5, wherein a default filter is defined for the active noise control of the hearing system, which is used when a sensor sensitivity of the hearing system falls below a predefined threshold value.

7. The method of claim 5, wherein one or more feedback filters and feedforward filters are arranged hierarchically sorted by class in a filter matrix as a function of shape and gain on the memory of the hearing system.

8. The method of claim 1, wherein one or both of the feedback microphone signal and the feedforward microphone signal is prefiltered by a high-pass, low-pass, or band-pass filter.

* * * * *